United States Patent

[11] 3,607,807

| [72] | Inventor | George R. Huddleston, Jr.<br>Baton Rouge, La. |
|---|---|---|
| [21] | Appl. No. | 832,971 |
| [22] | Filed | June 13, 1969 |
| [45] | Patented | Sept. 21, 1971 |
| [73] | Assignee | Copolymer Rubber & Chemical Corporation<br>Baton Rouge, La. |

[54] HIGH SOLIDS RUBBER LATEX AND METHOD
10 Claims, 1 Drawing Fig.

[52] U.S. Cl. .................................................. 260/23.7 A,
260/27 BB, 260/29.7 R, 260/83.3, 260/83.5,
260/85.1, 260/94.7 R, 260/887, 260/894
[51] Int. Cl. ........................................................ C08d 5/00
[50] Field of Search ........................................... 260/23.7 A,
27, 83.7, 29.7

[56] References Cited
UNITED STATES PATENTS

| 2,494,002 | 1/1950 | Rumbold .................... | 260/85.1 |
| 2,993,020 | 7/1961 | Carpenter .................. | 260/29.7 |

*Primary Examiner*—Donald E. Czaja
*Assistant Examiner*—Donald J. Barrack
*Attorney*—McDougall, Hersh, Scott & Ladd ABSTRACT: The preparation of a high solids, low viscosity rubber latex by blending a fast reaction latex of small particles with a slow reaction latex of large particles, before concentration, and preferably before stripping for removal of unreacted monomers, stripping and concentrating the blend to about 50 percent solids, freezing the concentrate after acidifying to a pH of about 8.3, and then thawing and concentrating the frozen blend to a solids content above 60 percent.

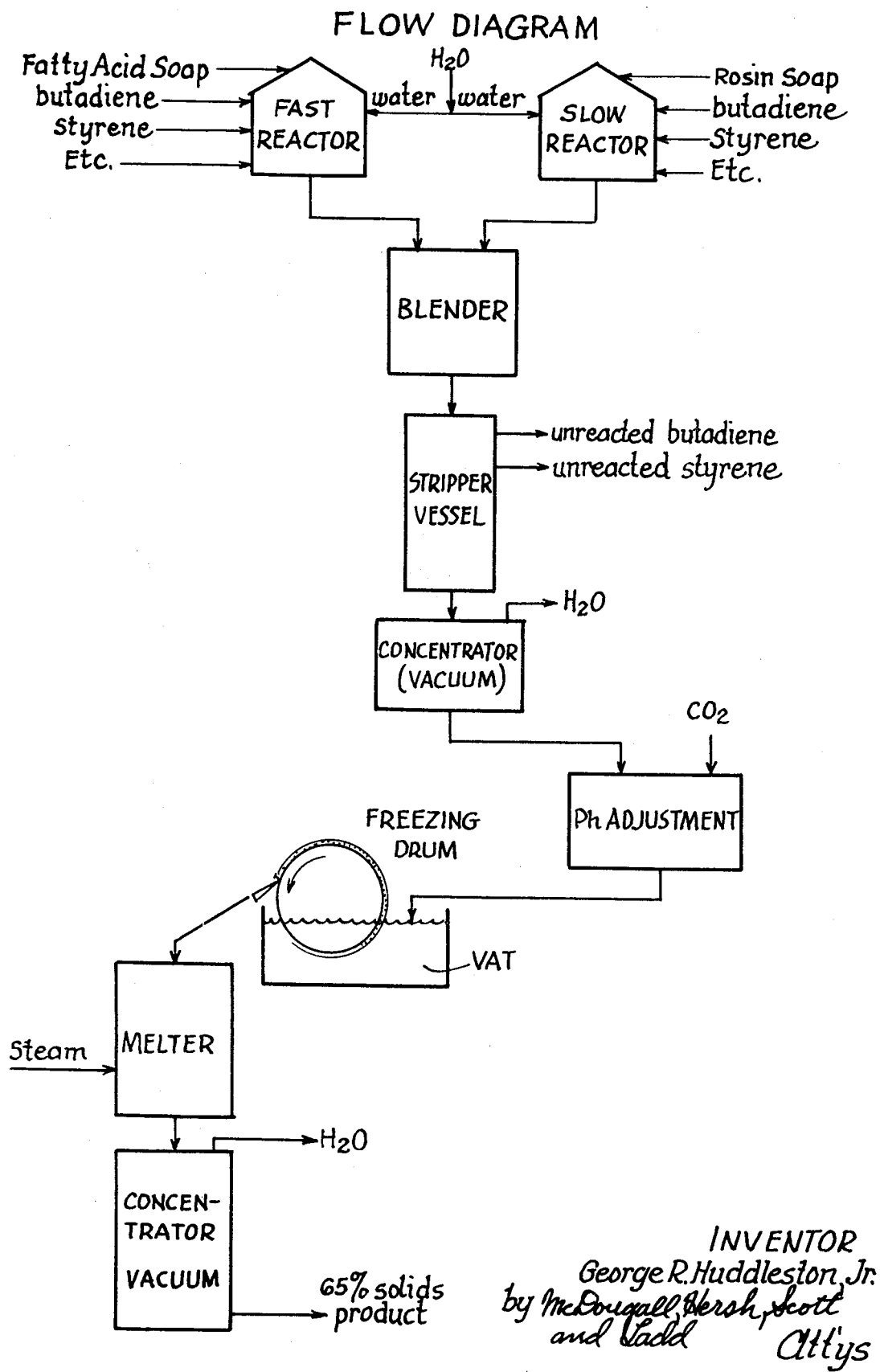

HIGH SOLIDS RUBBER LATEX AND METHOD

This invention relates to the production of a stable, high solids, low viscosity latex having improved properties and to a new and more efficient method for the production of same.

In U.S. Pat. No. 2,993,020, description is made of a method and apparatus for producing a high solids, low viscosity latex from a rubber latex which is prepared by a fast reaction in the presence of a long chain fatty acid soap wherein a latex of a large number of relatively small particles is produced. To increase the particle size in order to obtain a latex having a wide particle size distribution for producing a low viscosity, high solids content latex, the formed latex having a small particle size and a solids content of about 18–20 total solids content (TSC) is first stripped for the removal of unreacted monomers and then concentrated to 35–45 TSC. The concentrate is adjusted with an acidic medium, preferably by the introduction of carbon dioxide gas, to a pH within the range of about 8 to 8.5 after which the latex is subjected first to freezing, as by congealing on the surface of a freezing drum, and then thawing upon removal from the surface of the drum during which the particles of the latex combine to more or less double the size of the particles in the thawed latex. To achieve the desired particle size distribution, a portion, preferably about 60 percent of the frozen and thawed agglomerated latex is returned for blending with new concentrate while the remainder is removed as product and concentrated to about 60–65 percent solids to produce a latex having a wide particle size distribution with relatively low viscosity at the high concentration. By the described blend-back procedure to mix frozen and thawed latex having particles of increased dimension with unfrozen latex having the original particles of small dimension, and by subsequently freezing and thawing the blend, it becomes possible to secure a wide spectrum of particle size essential for achieving a latex of high solids and low viscosity.

The unusual stability that is experienced during the described processing of the latices can be explained by the fact that the amount of soap required to cover the large particles formed by the joinder of two or more smaller particles upon freezing is less than that originally required to cover the particles prior to joinder so that the frozen and thawed latex becomes soap-rich and when blended back with the unfrozen soap-poor latex, provides a stability which enables processing for freezing and concentrating without floc formation.

Thus a latex can be produced which is characterized by a high solids content of the order of 60 percent solids and low viscosity. The process is, however, faced with the difficulty that the viscosity does not always come down and the process also produces a microfloc that is difficult to separate, as by filtration. With such microfloc present, special precautions have to be taken during the freezing operations. In addition, the process requires a large surge tank capacity for holding the different stages of the latices. At some stages, the latex has a rather low pH with the result that it becomes unstable and an appreciable amount of coagulum forms. It is also subject to chemical and bacterial action which produce hydrogen sulfide and poor odors. Values typical of a finished latex prepared by the described technique are as follows:

| | |
|---|---|
| Solids | 66–67% |
| Viscosity | 2,000 c.p.s. |
| Viscosity at 60% | 100–200 c.p.s. |
| Surface tension at 40% | 32–36 dynes/cm. |
| Particle size | 2,000 A. |
| Emulsifier System | all fatty acid |
| % Soap Coverage | over 90% |

A rubber latex characterized by large particles can be produced by a process known as a slow reaction process wherein use is made of a rosin soap alone and preferably in combination with a fatty acid soap introduced in an amount to starve the reaction whereby the reaction starts at a very slow rate. The amount of soap added is sufficient slowly to start the reaction but insufficient to initiate the formation of an excess number of particles. However, before floc formation, additional increments of the soap are added to enable particles already formed to continue to continue to grow. Usually, two increments of soap are added during the polymerization reaction to produce a latex which takes a long time to prepare and is characterized by large particles.

During polymerization the latex becomes viscous and difficult to handle and it thus becomes difficult to introduce the soap into the reaction mixture at the calculated times. Final properties of the latex are greatly influenced by the time at which the first emulsifier or soap increment is added. If too early, new particles form and agglomeration is minimized with the result that the particle size is too small and the viscosity of the resulting latex is quite high. On the other hand, if the soap is added too late, floc forms in large lumps as precoagulated rubber which floats on the surface and excessive coagulum formation occurs in reactors, blowdowns and recovery vessels. The coagulum is somewhat sticky and tends to adhere to heat transfer surfaces with corresponding loss in product. Further, because of the high soap coverage, the resulting latex is quite foamy and difficult to process through the recovery area.

Values for a typical finished latex product by the slow reaction process described are as follows:

| | |
|---|---|
| Solids | 62–63% |
| Viscosity | 5,000–6,000 c.p.s. |
| Viscosity at 60% | 700–1,200 c.p.s. |
| Surface Tension at 40% | 48–50 dynes/cm. |
| Particle Size | 1,200–1,400 A. |
| Emulsifier System | mixed rosin and fatty acid soaps |
| % Soap Coverage | about 75% |

The use of a rosin soap or a mixture of a rosin soap with a fatty acid soap as emulsifier and the addition of such soap in increments characterizes a slow reaction process to form a latex in which the particle growth is controlled for producing a fewer number of larger particles, as distinguished from the larger number of small particles characteristic of the fast reaction latex. The use of a long chain fatty acid soap, added as a single increment at the start of the polymerization reaction, to nucleate a large number of particles in producing a latex having a large number of small particles is characteristic of the fast reaction, as these terms are hereinafter employed.

It is an object of this invention to produce and to provide a method for producing a rubber latex having greatly improved properties, which requires less surge tank capacity by comparison with the described freezing and thawing process for producing low viscosity, high solids latex by the fast reaction, in which little, if any, coagulum is produced to interfere with the process or otherwise reduce the yield thereof, in which the process can be carried out with more efficient utilization of equipment and materials to provide for increased capacity without increase in the amount of equipment, in which rate of recovery of rubber agglomerate is greatly improved with more efficient use of equipment, in which the formation of microfloc is substantially avoided thereby to provide for low viscosity which permits removal of coagulum, as by filtration, in which odor problems associated with storage at low pH is minimized, and in which a latex of better quality and more widespread, trouble-free utilization is obtained.

The invention is addressed to synthetic rubber latices and the method for the preparation of same wherein the rubber comprises rubbery homopolymers of conjugated diolefins and/or rubbery copolymers of conjugated diolefins with monoethylenically unsaturated monomers. Illustrative of the polymerizable materials which may be used in the preparation of synthetic rubber latices in accordance with the practice of this invention are the various 1,3-butadienes, such as 1,3-butadiene, 2-methylbutadiene-1,3, piperlyene and 2,3-dimethyl-butadiene-1,3. The polymerizable material can be a mixture of a 1,3-butadiene with another polymerizable compound capable of forming rubbery copolymers with 1,3-butadiene. For example, such mixture may contain up to 50 percent or more of a compound which contains a $CH_2=C=$ group wherein at least one of the disconnected valences is attached to an electroactive group, i.e. a group which substantially increases the electrical dissymmetry or polar character of the molecule Examples of compounds containing the aforementioned group and capable of copolymerization with the 1,3-butadiene are the aryl olefins, such as styrene and vinyl naphthalene; alpha-methylene carboxylic acids and their esters, nitriles and amides, such as acrylic acid, methylacrylate, methylmethacrylate, acrylonitrile, methacrylonitrile and methacrylamide; isobutylene; methylvinyl ether; and methylvinyl ketone. The preferred polymerizable material is a mixture of butadiene and styrene wherein the styrene content of the mixture is less than about 50 percent by weight.

The synthetic rubber latices may be prepared with conventional formulations by conventional processes which are well known in the art wherein the polymerizable monomeric compounds are emulsified in an aqueous medium by means of an emulsifying agent, such as a soap, or other suitable surface-active agent, and the polymerization made to take place at suitably cooled temperatures, such as at a temperature of about 40° F. for a GR-S latex, in the presence of a suitable catalyst and/or other regulating material, as described in U.S. Pat. No. 2,993,020, U.S. Pat. No. 3,130,171 and U.S. Pat. No. 3,296,178, all assigned to Copolymer Rubber & Chemical Corporation, and incorporated herein by reference.

The primary emulsifier in the fast reaction should preferably be a long chain fatty acid soap, with best results being secured with sodium and/or potassium oleate. The primary emulsifier in the slow reaction should be a rosin soap and preferably a mixture of a rosin soap and a long chain fatty acid soap with the preferred rosin soap being a disproportionated rosin soap or tall oil. The polymerization is generally "short-stopped," at a suitable stage short of complete conversion, such as at about 60–65 percent conversion of the monomers, and the unreacted monomers are stripped from the latex, as by means of conventional flashing or other stripping techniques.

It has been found, in accordance with the practice of this invention, that many of the objections heretofore experienced, as described in the production of a high solids, low viscosity latex or latices formed by the fast reaction and many of the problems encountered in the production of high solids latices by the slow reaction and the objectives heretofore enumerated for the more efficient production of an improved high solids latex having improved properties, can be achieved by a sequence of steps wherein latices separately formed by the slow reaction and by the fast reaction are blended one with the other as they are produced, with, but preferably without, previous stripping for the removal of unreacted monomers. The blend of the latices is then stripped concentrated to about 50 TSC and then subjected to freezing in the usual manner, as on the surface of a continuously rotating freezing drum after the pH has been reduced to about 7.5 to 8.5 and preferably within the range of 8.2 to 8.5, followed by thawing and then concentrating to a solids content preferably above 65 percent.

While the latex formed by the slow reaction will not freeze without floc and while the slow reaction latex is difficult and dangerous to freeze by reason of the presence of the rosin soap or disproportionated rosin, it has been found that the blend of the slow reaction latex with the fast reaction latex makes sufficient long chain fatty acid soap available to overcome the difficulties and enables the blend to be subjected to freezing and thawing without harmful limitations being imposed by reason of the presence of the rosin soap. The ratio is not critical but it is desirable to make use of a sufficient amount of the fast reaction latex to provide the desired stability to the blend. The latices can be blended in the ratio of 90–40 parts by weight on a solids content basis of the slow reaction latex to 10–60 parts by weight of the fast reaction latex and preferably 60–80 parts by weight of the slow reaction latex to 40–20 parts by weight of the fast reaction latex. Heat results are secured with the latices blended in the ratio of about 70 parts by weight of the slow reaction latex to about 30 parts by weight of the fast reaction latex.

While the two latices can be blended after concentration, and after stripping, it is preferred to blend the two latices before stripping and concentration so that the blend will be in a highly fluid state. Thus, any floc that forms will be capable of easy removal, as by filtration. The resulting blend is much less foamy and flow rates through the recovery units are thus capable of being greatly increased.

Of considerable significance is the fact that the two latices are capable of separate preparation in batch operations in the ratios desired for blending one with the other to provide a straight line operation which eliminates the need for storage facilities facilities for feedback and the like. Thus considerable equipment and space can be freed for other operations. The product from the final thawing and concentrating step is ready for shipment to desired stations for use in the production of foamed or other rubber products.

pH adjustment of the blend before freezing is preferably effected by the introduction of gaseous carbon dioxide, as described in the aforementioned patents. Instead of carbon dioxide, use can be made of any weak acid or weak acid salt, such as formic acid, oleic acid, methyl formate and the like. It is preferred to make use of carbon dioxide since it can be easily removed by boiling when there is no longer any need for the acidic pH adjustment.

As illustrated in the accompanying flow diagram, the latices from the slow reaction vessel and from the fast reaction vessel are fed in predetermined amounts to a stripping vessel from which unreacted monomers are removed. From the stripping vessel, the blend is advanced to an evaporator for concentrating the blend to about 50 percent solids. The concentrate is introduced into a vat into which carbon dioxide is bubbled to adjust the pH to within the range of 8.2 to 8.5. The blend is thus adjusted to yield a surface tension preferably within the range of 44–48 dynes/cm., after freezing. If below this level, the pH is raised and if above the level, the pH is lowered. From the vat, the blend is pumped into a bath over which a freezing drum is mounted for slow rotational movement with the lower portion of the drum submerged below the surface of the bath. The walls of the drum are refrigerated to a temperature within the range of $-10°$ to $+15°$ F., as by means of a refrigerant such as ammonia. In a typical operation, use is made of a drum having a diameter within the range of 6 to 8 feet, rotated at a rate of 6 r.p.m., with the viscosity of the latex controlled for congealing a frozen layer on the surface of the drum having a thickness within the range of 1/10 to 1/4 inch.

The blend which congeals as a frozen layer on the surface of the drum is continuously stripped from the drum by a scraper blade for displacement of the frozen material to a melting tank which is steam heated to reduce the frozen blend to the liquid state. The thawed latex is advanced to an evaporator concentrator or other conventional means for removing water to concentrate the product to about 65–70 TSC.

Having set forth the basic concepts of this invention, illustration of the invention will be made by way of a specific example which is given by way of illustration, but not by way of limitation.

Example 1

| Slow reaction latex Recipe Ingredients | Parts/100 Monomer |
| --- | --- |
| Butadiene | 71 |
| Styrene | 29 |
| Charge Soap Solution | 2.0 |
| Water (65 parts total) | 27.38 |
| Sodium formaldehyde sulfoxylate | 0.026 |
| $C_{10}$-$C_{13}$ tertiary mercaptan | 0.045 |
| Diisopropylbenzene hydroperoxide | 0.02 |
| Charge Soap Solution | |
| Nilox TGK | 2.00 |
| Potassium Sulfate | 0.60 |
| Sodium salt of condensed naphthalene sulfonic acid | 0.75 |
| Sodium salt of ethylene diamine | |

Example 1—Continued

| | |
|---|---|
| tetraacetic acid | 0.013 |
| Sodium hydrosulfite | 0.030 |
| Water | 25.178 |
| Sodium dimethyldithiocarbamate | 0.003 |
| Increment Soap Solution | |
| Potassium Oleate | 1.7 |
| Potassium Sulfate | 0.567 |
| Sodium salt of condensed naphthalene sulfonic acid | 0.850 |
| Sodium Hydrosulfite | 0.020 |
| Water | 12.443 |

In the foregoing recipe the Nilox TGK is a disproportionated rosin soap containing 65 percent disproportionated rosin and 35 percent soap of fatty acids.

The charge soap solution is prepared and the pH is adjusted to 10.2 to 10.6. It is placed in the reactor and additional pigment is added with the temperature maintained at 41°F. The initiator, diisopropylbenzene hydroperoxide is added last. The polymerization proceeds rapidly to about 17–20 percent solids at which time it starts to slow down and agglomeration of some of the latex particles takes place. At this time, 1.2 parts of the incremental soap solution is added after adjustment of the increment soap solution to a pH of 11.4 to 11.8. The polymerization then proceeds to about 30 percent solids after which the last 0.5 parts soap increment is added. The polymerization is "short-stopped" with 0.10 parts sodium dimethyldithiocarbamate when the point of 60 percent conversion of the monomers has been reached.

Example 2

| Fast reaction latex Recipe | |
|---|---|
| Butadiene | 100–50 |
| Styrene | up to 50 |
| Potassium or sodium oleate | 1.5–5.0 |
| Electrolyte[1] | 0.2–1.5 |
| Secondary emulsifier[2] | 0–1.5 |
| Ethylenediamine tetraacetic acid tetra sodium salt[3] | 0–0.10 (in soap solution) |
| Sodium hydrosulfite | 0–1.10 |
| Water | 150–250 |
| Sodium formaldehyde sulfoxylate | 0.04–0.20 |
| Diisopropylbenzene hydroperoxide or p-menthane hydroperoxide | 0.05–0.30 |
| Tertiarydodecylmercaptan | 0–0.3 |
| Ferrous sulfate heptahydrate | 0.02–0.04 |
| Versene 100 to complex ferrous sulfate | 0.03–0.06 |
| Shortstop | 0.05–0.20 |

[1] The following electrolytes or mixtures of any two may be used: Potassium chloride, sodium chloride, trisodium phosphate, tripotassium phosphate, potassium pyrophosphate, potassium sulfate, sodium sulfate, sodium borate and lithium chloride.
[2] Tamol N, Daxad 11, Nycol (polymerized sodium salts of alkyl naphthalene sulfonic acid).
[3] Sold as Versene 100, a product of Dow Chemical Company; Sesquestrene 30 A, a product of Alrose Chemical Company; Nullapon BF–13, a product of Astara Chemicals.

A typical example of the ratio of monomers for the preparation of a GR-S latex by the fast reaction comprises 71 parts butadiene to 29 parts styrene. The reaction is carried out by the conventional "cold rubber" process as described in U.S. Pat. No. 2,993,020 with the polymerization short-stopped at 60 percent conversion.

Seventy parts by weight on a solids basis of the slow reaction latex of example 1 and 30 parts by weight of the fast reaction latex of example 2 are blended and then stripped under vacuum to effect removal of unreacted monomers. The stripped blend is then concentrated in a vacuum evaporator to about 50 percent solids. Carbon dioxide is introduced to reduce the pH to about 8.3 and the acidified blend is subjected to freezing on the surface of a rotating drum which is refrigerated to a temperature of about 14° F. The layer of frozen blend which congeals on the surface of the drum is removed, as by a scraper, for displacement to a melting tank which is steam heated to produce a thawed latex blend of about 45–50 TSC. The thawed material is then further concentrated by evaporation under vacuum to a solids content of about 65 percent to produce a latex product having the following characteristics:

| | |
|---|---|
| Solids | 64.5% |
| Viscosity as is | 800 |
| Viscosity at 60% | 160 |
| Surface tension at 40% | 39 |
| Particle Size | 1,700 A |
| % Soap Coverage | 85 |

As previously pointed out, the slow reaction latex and the fast reaction latex can be blended after they have been stripped but it is preferred to effect the blend before stripping to provide for greater fluidity for removal of floc that may form upon mixture. Typical values for a blend processed in accordance with the practice of the invention of separately stripped latices were as follows:

| | |
|---|---|
| Solids | 65.4% |
| Viscosity as is | 1,570 c.p.s. |
| Viscosity at 60% | 170 c.p.s. |
| Surface Tension | 35.5 dynes/cm. |
| Particle Size | 1,835 A. |

Comparable results are incapable of being secured when the two latices are blended after concentrating since the latices are difficult to blend in such highly viscous form. The slow reacting latex is relatively soap-poor compared to the freeze agglomerated fast reacting latex and some local shocks occur upon mixing. When such shocks result in precoagulum formation, they often occur as a very fine rubber particle, referred to herein as microfloc. Microfloc particles are incapable of traveling without difficulty through the viscous medium. Over a period of time such microfloc particles grow and test indicate higher coagulum levels. Removal of floc from the finished latex is difficult because of the high viscosities that they tend to impart.

Numerous benefits are derived from the practice of this invention in the production of a stable high solids, low viscosity latex: the process described completely eliminates the blend-back procedures characteristic of the processing of frozen and thawed fast reaction latex thereby to eliminate the large amount of storage and blending equipment otherwise required.

The problem with floc is substantially eliminated with corresponding elimination of cleanout problems. The amount of floc is reduced by at least 30 percent with corresponding decrease in loss of rubber with the floc. For example, in previous processes rubber loss in the amount of 10 percent was experienced with floc and this has now been reduced to about 3 percent by the process of this invention.

Before it was difficult to strip the slow reaction latex because of its high viscosity but the greater fluidity which is secured by the blend permits monomer to be stripped at a much higher rate with the use of conventional blend equipment for stripping, such as flash tanks or multiple stage stripping columns. The process permits batch operation for producing the separate latices with immediate blend thereby to eliminate the need for tank storage of slow and fast reacting latices.

The process of this invention requires less handling of the latices with corresponding reduction in exposure to bacteria and the lower viscosity coupled with high solids enables loading of transport facilities for dispatch in relatively little time.

It will be apparent from the foregoing that I have provided a process which makes more efficient utilization of equipment, materials and time for the production of a more stable high solids, low viscosity latex with higher yield and less production problems.

It will be understood that changes may be made in the details of formulation and operation without departing from the spirit of the invention, especially as defined in the following claims.

1. A method for the production of stable, high solids, low viscosity latex of rubbery homopolymers of conjugated diolefins or rubbery copolymers of conjugated diolefins with one or more monoethylenically unsaturated monomers comprising the steps of slow reacting the monomers in aqueous emulsion in the presence of a rosin soap, fast reacting the monomers in an aqueous emulsion in a separate reaction in the presence of a long chain fatty acid soap, blending the slow reaction latex with the fast reaction latex, stripping unreacted monomers from the latex before or after blending, concentrating the blended latex by the removal of water, adjusting the concentrate to a pH within the range of 7.5 to 8.5, freezing the blend after pH adjustment and thawing the frozen latex blend and then concentrating the thawed latex to a concentration above 60 percent by the removal of water.

2. The method as claimed in claim 1 in which the long chain fatty acid soap is a soap of oleic acid.

3. The method as claimed in claim 1 in which the slow reaction is carried out in the presence of a rosin soap in admixture with a long chain fatty acid soap.

4. The method as claimed in claim 1 in which the latices are stripped of unreacted monomer after blending but before removal of water to concentrate.

5. The method as claimed in claim 1 in which the slow reaction latex and the fast reaction latex are blends in the ratio of 40-90 parts by weight on a solids content basis of the slow reaction latex to 60-10 parts by weight of the fast reaction latex.

6. The method as claimed in claim 1 in which the slow reaction latex and the fast reaction latex are blends in the ratio of 60-80 parts by weight of the slow reaction latex to 40-20 parts by weight of the fast reaction latex.

7. The method as claimed in claim 1 in which the slow reaction latex and the fast reaction latex are blends in the ratio of 70 parts by weight of the slow reaction latex to 30 parts by weight of the fast reaction latex.

8. The method as claimed in claim 1 in which the blend is concentrated to a solids content within the range of 45-50 percent pH adjustment and freezing.

9. The method as claimed in claim 1 in which the blend, after acidification, is frozen in the form of a layer on a continuously moving refrigerated surface and the frozen layer is continuously removed from the surface for thawing.

10. A stable, high solids, low viscosity latex of an agglomerated rubber selected from the group consisting of a homopolymer of a conjugated diolefin and a copolymer of a conjugated diolefin with one or more monoethylenically unsaturated monomers, prepared by the method of claim 1.